United States Patent [19]
Krambrock et al.

[11] 3,938,848
[45] Feb. 17, 1976

[54] METHODS AND APPARATUS FOR THE PNEUMATIC CONVEYING OF MATERIAL

[75] Inventors: Wolfgang Krambrock, Ravensburg; Paul Lübbehusen, Ravensburg-Durnast; Hans-Jürgen Hück, Obereschach, all of Germany

[73] Assignee: Waeschle Maschinenfabrik GmbH, Ravensburg, Germany

[22] Filed: Feb. 19, 1974

[21] Appl. No.: 443,243

[30] Foreign Application Priority Data
July 6, 1973  Germany............................ 2334360

[52] U.S. Cl. ...................... 302/42; 134/37; 302/49; 302/64; 302/66
[51] Int. Cl.²......................................... B65G 53/66
[58] Field of Search ............................... 302/26–28, 302/35, 41, 42, 49, 53, 64, 66; 15/304, 316 A, 405–408; 134/22 C, 37

[56] References Cited
UNITED STATES PATENTS

| | | | |
|---|---|---|---|
| 759,750 | 5/1904 | Rosenthal | 302/42 |
| 1,568,139 | 1/1926 | Dewey | 302/49 |
| 1,733,302 | 10/1929 | Horn | 302/64 X |
| 2,261,347 | 11/1941 | DiSanto et al. | 302/64 |
| 2,620,632 | 12/1952 | Rose | 15/316 A |
| 2,825,922 | 3/1958 | Murray | 15/316 A |
| 3,117,821 | 1/1964 | Mylting | 302/64 |
| 3,224,814 | 12/1965 | Fisher | 302/64 |
| 3,291,536 | 12/1966 | Smoot | 302/49 |
| 3,316,024 | 4/1967 | Nakano | 302/26 |
| 3,380,780 | 4/1968 | Allen et al. | 302/26 |

*Primary Examiner*—James B. Marbert
*Assistant Examiner*—Jeffrey V. Nase
*Attorney, Agent, or Firm*—Donald D. Jeffery

[57] ABSTRACT

A method for pneumatically conveying material through a conveyor conduit comprises automatically interposing into the conveying operation cleaning phases in which no material is introduced into the conduit, to remove material previously deposited in the conduit. Apparatus has a timing means which rhythmically interrupts the introduction of material, and the strength of the air flow in the cleaning phases can be greater than that of the air flow during the conveying phases.

12 Claims, 2 Drawing Figures

METHODS AND APPARATUS FOR THE PNEUMATIC CONVEYING OF MATERIAL

BACKGROUND OF THE INVENTION

Difficulties are often encountered in pneumatically conveying material such as finely powdered substances which tend to form deposits on the wall of a conduit through which the substances are conveyed.

Such a tendency is shown by particularly fine bulk materials having grain sizes of less than about 10 $\mu$m, and occasionally the conduit may become so incrusted with material on its internal surface that the conduit is completely blocked.

Various possible ways of pneumatically conveying such materials have already been proposed, for example in one method of pneumatic conveying, a pipe is arranged within a conveyor conduit and air is blown into the pipe and thence into the conveyor conduit, in order to prevent material from accumulating in the conveyor conduit. However, this is often ineffective when conveying very fine substances such as dye pigments, milk and polyvinylchloride powders. Another method of pneumatically conveying fine materials comprises disposing a by-pass pipe parallel to the conveyor conduit, so that air in the by-pass pipe can be blown into the conveyor conduit to prevent material accumulating. However, the by-pass pipe can easily become blocked.

Another such method comprises introducing material into a conveyor conduit, with an intermittent feed, so that in effect short blocks or plugs of material are conveyed in succession through the conduit. If this method is employed in a conveyor conduit of transparent material, it is possible to see that the blocks or plugs of material are only maintained as such for about 5 to 15 minutes, and then break up into a semicontinuous stream or hank of material, which subsequently breaks up uncontrolledly, resulting in deposits of material being formed on the conduit wall which in turn can result in complete blockage of the conduit.

Yet again, intermediate cleaning of the conveyor conduit, of deposits in the conduit, can be effected by utilising the flow of conveyor air. In this method the delivery of material into the conveyor conduit is temporarily restricted or completely stopped, whenever the conveying pressure in the conduit rises beyong a given value, such rise indicating the danger of a blockage. However, when conveying some substances, or when conveying substances in a certain condition, for example with a high moisture content, the rise in conveying pressure is followed immediately and irresistibly by blockage of the conduit, so that this method is not satisfactory. This applies particularly when the material being conveyed is liable to form on the conduit walls a deposit which subsequently peels off, giving rise to a sudden accumulation of material so that the rise in conveying pressure and blockage of the conduit occur almost simultaneously.

SUMMARY OF THE INVENTION

A first object of the present invention is to overcome the disadvantages of the previously proposed methods.

A further object of the present invention is reliably to prevent blockages in a conveyor conduit, due to the deposition of material on the conveyor conduit wall, when pneumatically conveying materials having a tendency to form deposits on the conveyor conduit wall.

Yet another object of the present invention is to provide a method in which a conveyor conduit is cleaned by the conveyor air flow, and such cleaning occurs automatically.

In accordance with the invention, these and other objects are achieved, when conveying material which tends to form deposits on a conveyor conduit wall, by an automatically determined alternate succession of conveying phases, in which material is introduced into and conveyed in the air flow, and cleaning phases in which the introduction of material into the air flow is stopped, the air flow removing deposited material from the conveyor conduit. Conveyor conduit cleaning phases are thus automatically interposed in the conveying operation, so that the flow through the conduit in a cleaning phase consists only of air, and does not include any material to be conveyed, and all the air is available to clean out the conduit. It is desirable for the strength of the air flow through the conduit in the cleaning phases to be greater than the flow of air through the conduit in the material conveying phases, to provide an enhanced cleaning action. The rate of alteration as between conveying and cleaning phases should be so adjusted as to be more rapid than the specific rhythm of material depositing on the conduit wall and deposited material peeling from the conduit wall.

Apparatus according to the invention comprises a conveyor conduit and a compressor means for producing a flow of conveying air through the conduit. The material is introduced into the conduit, for conveyance therein by the air flow, while timing means rhythmically and automatically control the material introducing means, in order periodically to interrupt the introduction of material into the conduit. Therefore, there is an alternate succession of conveying phases and conduit-cleaning phases. The means for introducing material can be a rotatable bucket-wheel charging valve, or a shut-off valve. The timing means can also control a valve on a branch or by-pass pipe which is arranged in shunt to the compressor means, so that when the valve forming the material introducing means is closed to interrupt the introduction of material into the conduit, the valve on the branch pipe is also closed, with the result that the entire air output from the compressor means is passed through the conveyor conduit, instead of a part being passed through the branch pipe, as occurs when the valve on the branch pipe is open.

DESCRIPTION OF THE PREFERRED EMBODIMENTS

Figure 1:
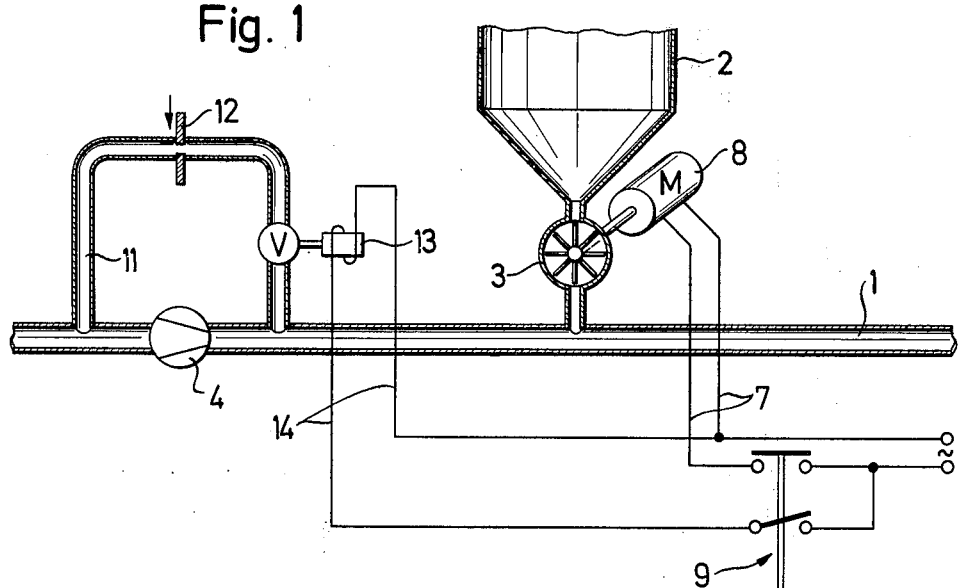
FIG. 1 shows a first embodiment of apparatus according to the invention.

Referring firstly to FIG. 1, the first embodiment of the apparatus has a conveyor conduit 1 for carrying material to be pneumatically conveyed. A pressure-free delivery container 2 for the material is connected to the conveyor conduit 1 by way of a flow control valve in the form of a bucket wheel charging valve 3 comprising a rotatable wheel forming cells or buckets for carrying material from the container 2 to the conduit 1. Arranged upstream of the input of material into the conveyor conduit 1 is a compressor diagrammatically shown at 4. Connected into a current supply line 7 for drive motor 8 for driving the charging valve 3 is an electromagnetically operated switch 9 which is actuatable by an adjustable timing means 10. The switch 9 has two contact assemblies, the first of which controls the supply of current to the motor 8, while the second controls an electromagnetically operated valve 13, as will now be described.

The compressor 4 is provided with a branch or by-pass connection pipe 11 with flow-restrictor or screening means 12 and the above-mentioned electromagnetically operated valve 13. The second contact assembly of the switch 9 actuatable by the timing means 10 is arranged to close and open respectively the current supply line 14 to the valve 13. The output of the compressor 4 is greater than that required for conveying material through the conduit 1, for a purpose that will become apparent below. Consequently, in normal conveying operation the valve 13 is open and part of the output air from the compressor 4 is passed through the pipe 11, this part being determined by the means 12. To clean the conduit 1, the delivery of material into the conduit 1 is interrupted in a time rhythm by operation of the timing means 10 to actuate the switch 9 thereby to stop rotation of the charging valve 3. At the same time the valve 13 in the pipe 11 of the compressor 4 is also closed so that no air from the compressor 4 will flow in the branch pipe 11. Therefore the air flow in the conduit 1 is no longer limited by the above-mentioned part of the compressor output being taken off through the pipe 11, and the full air output of the compressor is without delay passed into the conveyor conduit 1 and causes it to be rapidly cleaned of any material deposited therein. Then charging valve 3 is set in operation again, and the valve 13 in the branch pipe 11 is opened, by the operation of the timing means 10. Material is therefore passed into the conduit 1 for conveying, and the air flow in the conduit 1 is reduced to the normal operation flow. This cycle, in which a cleaning phase and a conveying phase alternate with each other, can be repeated as desired.

It has previously been found, when conveying substances of a particular nature, or when conveying substances in a particular condition, for example when the substances contain moisture, that material deposited in a conveyor conduit tends, after a given amount of deposit has been formed, to peel suddenly from the surface of the conduit on which the deposit occurs. This peeling can give rise to a sudden accumulation of material in the conduit, causing the conduit to be blocked in some cases. The diameter of the conduit and the air and material through-put also influence the cycle of deposition and peeling off. For example with polyvinylchloride pastes, this cycle lasts about 5 minutes, with material loadings of 10 kp substance/kp air in a conduit of NW 100. In the case of such substances, the cycle of the alternation between the conveying and the cleaning phases as described above, should be adjusted in accordance with the deposition-peeling cycle which is specific to that substance being conveyed, that is to say, the conveying-cleaning cycle should be made somewhat shorter, i.e. more rapid, than the cycle specific to the substance. In this way it was found possible for the through-put of a PVC powder conveyor apparatus to be increased by about 80%, under otherwise identical conditions.

Figure 2:
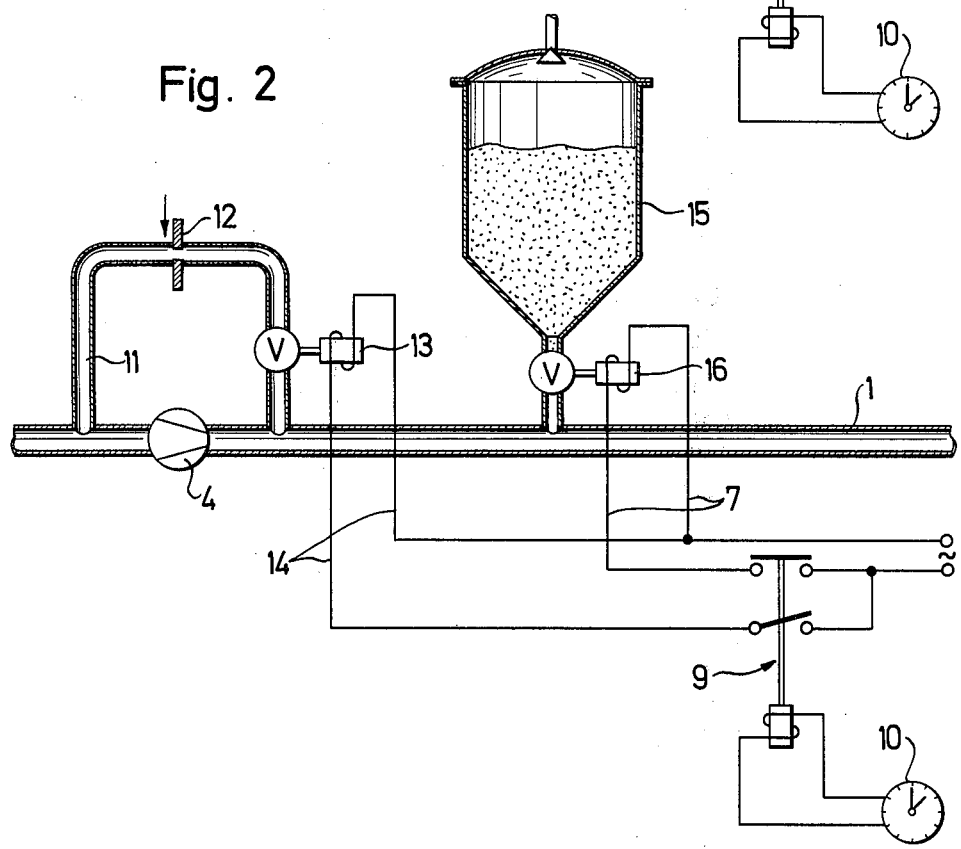
FIG. 2 shows a second embodiment of apparatus according to the invention.

The embodiment shown in FIG. 2 differs from that shown in FIG. 1 only in that a pressurised container 15 is used for the material to be discharged into the conduit 1, instead of the pressure-free container 2 in FIG. 1, and an electromagnetically operated shut-off valve 16 replaces the charging valve 3. The mode of operation of this embodiment will thus be apparent in the light of the description of the FIG. 1 embodiment, to produce the conveying phase-cleaning phase cycle as described.

We claim:

1. A method of pneumatic conveying by air flow of material which tends to form deposits on a conveyor conduit wall and, when given amounts of such deposits have been so formed, to peel off the thus formed deposits from the conduit wall with the probability that such peeled off deposits will form a blockage in the conduit, and wherein the deposit and peeling off process possesses a rhythm cycle specific to the material being conveyed, comprising the steps of automatically alternating conveying phases in which the material is introduced into the conveying air flow and conveyed in continuous flow through said conduit, and cleaning phases in which the introduction of material into the air flow is stopped and only air passed through said conduit for completely removing all material in said conduit, including deposited material, for cleaning said conduit before additional material is introduced into said conduit, and further including the step of alternating said conveying and cleaning phases with a rhythm that is substantially more rapid than said rhythm cycle of material deposit and peeling off so as to remove the deposits from the conduit wall before thay build up in size sufficient to peel off and cause blockage.

2. The method according to claim 1, including the separate step of increasing the flow of air supplied to said conveying conduit upstream of where the material is introduced into said conveying conduit during said cleaning phase as compared to said conveying phase and independently of the fluid flow resistance characteristics of the material and the conveyor conduit.

3. The method according to claim 2, wherein said step of increasing the flow of air includes the steps of supplying air to said conveyor conduit by a compressor having its output connected to said conveyor conduit upstream from where the material is introduced into said conveyor conduit during both said cleaning and conveying phases, conducting only a portion of the output of the compressor through the conveyor conduit during the conveying phase and conducting the entire output of the compressor through said conveyor conduit during the cleaning phase.

4. The method according to claim 3, wherein said step of increasing the flow of air further including conducting the remaining portion of the output of the compressor during said conveying phase back to the input of the compressor by means of a by-pass passage having therein an open valve, and further including the step of closing the valve during the cleaning phase to prevent movement of air through said by-pass passage.

5. The method according to claim 4, further including the step of restricting the flow of air through said by-pass passage independently of said valve to control the air flow characteristics for said conveying phase.

6. Apparatus for the pneumatic conveying by air flow of material which tends to form deposits on a conveyor conduit wall and, when given amounts of such deposits have been so formed, to peel off the thus formed deposits from the conduit wall with the probability that such peeled off deposits will form a blockage in the conduit, and wherein the deposit and peeling off process possesses a rhythm cycle specific to the material being conveyed, comprising: a conveyor conduit having an input end and a discharge end; means for producing an air flow through said conveyor conduit; means for introducing material to be conveyed into the input end of said conveyor conduit so as to be conveyed continuously through said conduit by the air flow and discharged through said discharge end of said conduit; timing means for rhythmically and automatically controlling the material introducing means for periodically interrupting the introduction of material into said conveyor conduit to thereby produce an alternate succession of conveying phases and conduit cleaning phases of a predetermined phase rhythm, the material in the conduit during the conveying phase, including said deposited material, being completely removed from the conduit during the cleaning phase before additional material is introduced into said conduit; said timing means being adjusted so that said rhythm of said conveying and conduit cleaning stages is more rapid then said rhythm cycle of material deposit and peeling off whereby deposits of material are removed by the cleaning phase before they build up in size sufficient to peel off and cause blockage of said conveyor conduit.

7. The apparatus of claim 6, including means for automatically increasing the flow of air through said conveyor conduit during said cleaning phase as compared to said conveying phase and independently of the fluid flow resistance characteristics of the material and said conveyor conduit.

8. The apparatus of claim 7, wherein said means for producing an air flow includes a compressor having a discharge and an inlet, and said means for increasing the flow of air through said conveyor conduit includes means for conducting only a portion of the compressor discharge through said compressor discharge only during said conveying phase, and conducting the entire output of said compressor discharge through said conveyor conduit during said cleaning phase.

9. The apparatus of claim 8, wherein said means for increasing the flow of air through said conveyor conduit includes a by-pass extending from a position between said compressor discharge and said conveyor conduit where the material is introduced to a position upstream from the compressor inlet for conducting said remaining portion of compressor discharge in a by-pass from said compressor discharge directly to said compressor inlet, and further including a valve in said by-pass passage for closing said by-pass passage during said cleaning phase and opening said by-pass passage during said conveying phase.

10. The apparatus of claim 9, further including restrictor means in said by-pass passage independent of said valve means for controlling the flow of air through said by-pass passage when said valve is opened and thus controlling the flow of air through said conveyor conduit during said conveying phase.

11. The apparatus according to claim 6, wherein said introducing means includes a rotatable bucket wheel charging valve and a drive motor for rotating the charging valve, said timing means automatically deenergizing said drive motor to stop rotation of said charging valve during said cleaning phase and energizing said motor to rotate said charging valve during said conveying phase.

12. The apparatus of claim 6, including a pressurizable container for the material to be introduced into said conduit, and wherein said introducing means includes a shut-off valve that is selectively opened and closed by said timing means to provide flow of material into said conveyor conduit when open and to interrupt the flow of material into said conveyor conduit when closed.

* * * * *